United States Patent
Kitano

(10) Patent No.: US 10,414,131 B2
(45) Date of Patent: Sep. 17, 2019

(54) ADHESIVE SHEET, MANUFACTURING METHOD THEREFOR, AND LAMINATE

(71) Applicant: BRIDGESTONE CORPORATION, Chuo-ku, Tokyo (JP)

(72) Inventor: Hajime Kitano, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 385 days.

(21) Appl. No.: 15/101,415

(22) PCT Filed: Dec. 22, 2014

(86) PCT No.: PCT/JP2014/083974
§ 371 (c)(1),
(2) Date: Jun. 3, 2016

(87) PCT Pub. No.: WO2015/098875
PCT Pub. Date: Jul. 2, 2015

(65) Prior Publication Data
US 2016/0303832 A1    Oct. 20, 2016

(30) Foreign Application Priority Data

Dec. 24, 2013  (JP) ................. 2013-265935

(51) Int. Cl.
*B32B 7/12* (2006.01)
*B32B 25/04* (2006.01)
*C08K 5/37* (2006.01)
*C08K 5/14* (2006.01)
*C08K 5/17* (2006.01)
*C09J 163/00* (2006.01)
*C09J 163/04* (2006.01)
*C09J 7/10* (2018.01)

(52) U.S. Cl.
CPC ............... *B32B 25/04* (2013.01); *B32B 7/12* (2013.01); *C08K 5/14* (2013.01); *C08K 5/17* (2013.01); *C09J 7/10* (2018.01); *C09J 163/00* (2013.01); *C09J 163/04* (2013.01); *B32B 2255/10* (2013.01); *B32B 2255/26* (2013.01); *B32B 2405/00* (2013.01); *C08K 5/37* (2013.01); *C09J 2205/102* (2013.01); *C09J 2463/00* (2013.01)

(58) Field of Classification Search
None
See application file for complete search history.

(56) References Cited

U.S. PATENT DOCUMENTS

| | | | | |
|---|---|---|---|---|
| 3,819,399 A | * | 6/1974 | Campbell | ............... B05D 5/10 156/124 |
| 5,972,423 A | * | 10/1999 | Abbey | ................. C08G 59/68 427/140 |
| 2007/0096056 A1 | | 5/2007 | Takeuchi et al. | |
| 2009/0286015 A1 | | 11/2009 | Matsukawa et al. | |
| 2010/0022745 A1 | | 1/2010 | Takeuchi et al. | |
| 2010/0215937 A1 | | 8/2010 | Matsukawa et al. | |
| 2013/0302336 A1 | | 11/2013 | Heywood et al. | |
| 2014/0194554 A1 | | 7/2014 | Hefner, Jr. | |
| 2014/0256841 A1 | | 9/2014 | Kim et al. | |
| 2015/0315330 A1 | * | 11/2015 | Heath | ................. C08G 59/14 525/530 |
| 2015/0353791 A1 | | 12/2015 | Ishihara et al. | |

FOREIGN PATENT DOCUMENTS

| | | |
|---|---|---|
| CN | 1886437 A | 12/2006 |
| CN | 102762660 A | 10/2012 |
| CN | 103140533 A | 6/2013 |
| EP | 3006479 A1 | 4/2016 |
| JP | H10-139901 A | 5/1998 |
| JP | 2001-131262 A | 5/2001 |
| JP | 2004-211038 A | 7/2004 |
| JP | 2007-217673 A | 8/2007 |
| JP | 2008-0001857 A | 1/2008 |
| JP | 2010-155897 A | 7/2010 |
| JP | 2010-248380 A | 11/2010 |
| JP | 2012-062447 A | 3/2012 |
| JP | 4976575 B1 | 7/2012 |
| JP | 2013-087149 A | 5/2013 |
| WO | 2012/132203 A1 | 10/2012 |
| WO | 2013/058570 A2 | 4/2013 |
| WO | 2014/109217 A1 | 7/2014 |
| WO | 2014/188914 A1 | 11/2014 |

OTHER PUBLICATIONS

Search Report of the Chinese office action dated Apr. 28, 2018, from the SIPO in a Chinese patent application corresponding to the instant patent application.

* cited by examiner

*Primary Examiner* — Frank D Ducheneaux
(74) *Attorney, Agent, or Firm* — SOLARIS Intellectual Property Group, PLLC

(57) ABSTRACT

An adhesive sheet includes an adhesive composition layer. The adhesive composition layer is formed using a composition including a polythiol compound, a compound having plural epoxy groups, a radical generator and an amine-based catalyst. The ratio (Ep/SH (epoxy groups/thiol groups ratio)) of a total molar number (Ep) of epoxy groups contained in the compound having plural epoxy groups to a total molar number (SH) of thiol groups contained in the polythiol compound is higher than 0.20 but lower than 1.00.

15 Claims, No Drawings

ADHESIVE SHEET, MANUFACTURING METHOD THEREFOR, AND LAMINATE

TECHNICAL FIELD

The present invention relates to an adhesive sheet, a method of producing the same, and a layered body, and more specifically relates to, for example, an adhesive sheet suitable for adhesion to rubber and a method of producing the same, and a layered body in which a rubber layer is adhered using the adhesive sheet.

BACKGROUND ART

Although materials exhibiting excellent adhesive power to vulcanized rubber have thus far been desired, there has not been a material which provides sufficient adhesive power. An example of a method employed for adhering vulcanized rubber is disclosed in Japanese Patent Application Laid-open (JP-A) No. H10-139901, in which vulcanized rubber is surface-treated, and another member is adhered to the surface-treated face using an adhesive.

SUMMARY

The method described in JP-A No. H10-139901 includes adhering vulcanized rubber to another member using a polyurethane-based adhesive. However, there is still a room for improvement of adhesive power thereof.

In consideration of the above, the present disclosure relates to, for example, an adhesive sheet capable of exhibiting high adhesive power to rubber and a method of producing the same, and a layered body in which the adhesive sheet is used.

In order to achieve the above object, according to an aspect of the present invention, an adhesive sheet is provided that includes an adhesive composition layer formed using a composition including a polythiol compound, a compound having plural epoxy groups, a radical generator, and an amine-based catalyst, in which the ratio (Ep/SH (epoxy groups/thiol groups ratio)) of the total molar number (Ep) of epoxy groups contained in the compound having plural epoxy groups to the total molar number (SH) of thiol groups contained in the polythiol compound is higher than 0.20 but lower than 1.00.

According to embodiments of the present invention, it is possible to provide an adhesive sheet capable of exhibiting high adhesive power to rubber and a method of producing the same, and a layered body in which the adhesive sheet is used

MODES FOR CARRYING OUT INVENTION

Adhesive Sheet

The adhesive sheet according to an embodiment of the present invention is an adhesive sheet that includes an adhesive composition layer formed using a composition including:

a polythiol compound (hereinafter also referred to as "polythiol compound (A)");

a compound having plural epoxy groups (hereinafter also referred to as "compound (B) having plural epoxy groups);

a radical generator (hereinafter also referred to as "radical generator (C)"); and an amine-based catalyst (hereinafter also referred to as "amine catalyst (D)"), in which the ratio (Ep/SH (epoxy groups/thiol groups ratio)) of the total molar number (Ep) of epoxy groups contained in the compound (B) having plural epoxy groups to the total molar number (SH) of thiol groups contained in the polythiol compound (A) is higher than 0.20 but lower than 1.00.

The adhesive sheet includes at least the adhesive composition layer. The term "adhesive composition layer" as used herein refers to a layer formed by polymerization of the component (A) and the component (B) in a composition containing the components (A) to (D), as described below. When the above-described adhesive sheet is used, an "adhesion layer" strongly adhering to an adherend (particularly, rubber) can be formed by subjecting the adhesive composition layer to the aftermentioned adhesion treatment to promote a radical reaction of the component (A).

Further, an adhesive sheet that includes at least the adhesive composition layer may be used, and the adhesive sheet may further include the aftermentioned support and the like. In other words, the adhesive sheet may be formed of the adhesive composition layer alone, or may be configured to include a support and the adhesive composition layer retained on a surface of the support (and one or more other layers, if necessary).

In one embodiment, the adhesive sheet is able to exhibit high adhesive power to rubber in particular. Further, the adhesive sheet is also able to exhibit high adhesive power to vulcanized rubber as well as unvulcanized rubber. The reason therefor is not perfectly clear, but is conceivably as follows.

The adhesive composition layer in the adhesive sheet is a layer obtained by curing of a composition including the components (A) to (D) through an anion polymerization reaction of a part of the amount of the polythiol compound (A) and the compound (B) having plural epoxy groups.

When the adhesive sheet and rubber are to be adhered to each other, another part of the amount of the polythiol compound (A) contained in the adhesive composition layer is converted into a thiyl radical due to the radical generator (C) activated by an energy such as heat or light. The thiyl radical reacts with carbon-carbon double bonds present in the rubber, whereby an adhesion layer is formed.

Therefore, when the adhesive sheet is used, high film strength is achieved by polymerization reactions of the component (A) and the component (B). Moreover, high interfacial adhesive power is also obtained by chemical bonding of the adhesive composition layer to rubber through the thiol-ene reactions described above. It is conceivable that these enable formation of an adhesion layer having high adhesive power to rubber. In particular, the adhesive sheet exhibits high adhesive power to vulcanized rubber as well as to unvulcanized rubber, conceivably because carbon-carbon double bonds are present not only in unvulcanized rubber but also in vulcanized rubber.

It is also conceivable that chemical bonding between a sulfur atom in a thiol group in the polythiol compound (A) and a carbon atom in a carbon-carbon bond occurs as a result of a hydrogen abstraction reaction from the main chain formed by carbon-carbon bonds present in the rubber. Therefore, the adhesive sheet is able to exhibit adhesive power to rubber even when carbon-carbon double bonds are not necessarily present in the rubber.

When the adhesive sheet is used, it is conceivable that the adhesive sheet is able to exhibit sufficiently high adhesive power to rubbers in general, even in the case where surface roughening treatment, such as grinding, is not carried out on the adhesion faces of the rubbers, because the adhesive composition layer of the adhesive sheet and the rubber chemically bind to each other as described above. Omitting a surface roughening treatment on the adhesion face of the rubber, as described above, provides for simplification and improved efficiency of an adhering process.

Since the composition including the components (A) to (D) is also able to exhibit high adhesive power to vulcanized rubber, adhesion can be achieved at a remarkably lower temperature and over a remarkably shorter length of time (for example, from 100 to 150° C. for from 3 to 30 minutes) than when unvulcanized rubber materials are brought into contact with each other and adhesion is performed while vulcanizing them.

<Composition>

First, the composition used for forming the adhesive composition layer will be described.

In the present specification, the polythiol compound (A), the compound (B) having plural epoxy groups, the radical generator (C), the amine-based catalyst (D) and the after-mentioned surface adjustor (E) are also referred to as "component (A)", "component (B)", "component (C)", "component (D)", and "component (E)", respectively, in some cases.

<<Polythiol Compound (A)>>

In the present invention, the term "polythiol compound" refers to a compound having two or more thiol groups in one molecule thereof. As the component (A), one polythiol compound may be used singly, or two or more polythiol compounds may be used in combination.

In the polythiol compound (A), the number of thiol groups in one molecule thereof is not particularly limited as long as the above-defined relationship with the total molar number of epoxy groups in the component (B) is satisfied. From the viewpoint of improving the adhesive power, the polythiol compound (A) preferably has three or more thiol groups in one molecule thereof. The upper limit of the number of thiol groups in one molecule of the polythiol compound (A) is not particularly limited, and may be selected, as appropriate, as long as the effects according to the present invention are not impaired. The number of thiol groups in one molecule of the polythiol compound (A) may be appropriately selected within the range of usually from 2 to 7, preferably from 3 to 6, and more preferably from 3 to 4, although the number may vary depending on whether the polythiol compound (A) is a low-molecular-weight compound or a high-molecular-weight compound. However, these ranges should not be construed as limiting the scope of the present invention.

The scope of the polythiol compound (A) encompasses primary thiols, secondary thiols, and tertiary thiols. Primary thiols are preferable from the viewpoint of improving the adhesive power.

The molecular weight of the polythiol compound (A) is preferably 3000 or less, more preferably 2000 or less, still more preferably 1000 or less, further more preferably 900 or less, and particularly preferably 800 or less, from the viewpoint of improving the adhesive power. Further, the lower limit of the molecular weight of the polythiol compound (A) is not particularly limited. The lower limit of the molecular weight of the polythiol compound (A) is preferably 200 or more, and still more preferably 300 or more. When the polythiol compound (A) is a polymer, the "molecular weight" refers to the styrene-equivalent number average molecular weight.

Examples of the polythiol compound (A) include an aliphatic polythiol that may include a heteroatom and an aromatic polythiol that may include a heteroatom. An aliphatic polythiol that may include a heteroatom is preferable from the viewpoint of improving the adhesive power.

The "aliphatic polythiol that may include a heteroatom" refers to an aliphatic compound that has two or more thiol groups in one molecule thereof and that may include a heteroatom. The "aromatic polythiol that may include a heteroatom" refers to an aromatic compound that has two or more thiol groups in one molecule thereof and that may include a heteroatom.

From the viewpoint of improving the adhesive power, the included heteroatom, or heteroatoms, is preferably at least one kind selected from the group consisting of oxygen, nitrogen, sulfur, phosphorus, halogen, and silicon; is more preferably at least one kind selected from the group consisting of oxygen, nitrogen, sulfur, phosphorus, and halogen; and is particularly preferably at least one kind selected from the group consisting of oxygen, nitrogen, and sulfur.

(Aliphatic Polythiol that may Include Heteroatom)

Examples of the aliphatic polythiol that may include a heteroatom include: a polythiol in which the portion other than the thiol groups is an aliphatic hydrocarbon, such as an alkanedithiol having from 2 to 20 carbon atoms; a polythiol obtainable by replacing halogen atoms of a halohydrin adduct of an alcohol by thiol groups; a polythiol that is a hydrogen sulfide reaction product of a polyepoxide compound; a thioglycolic acid ester obtainable by an ester-forming reaction between a polyhydric alcohol having from 2 to 6 hydroxyl groups in a molecule thereof and thioglycolic acid; a mercapto fatty acid ester obtainable by an ester-forming reaction between a polyhydric alcohol having from 2 to 6 hydroxyl groups in a molecule thereof and a mercapto fatty acid; a thiol isocyanurate compound obtainable by a reaction between an isocyanurate compound and a thiol; a thiol that includes a polysulfide group; a silicone modified with thiol groups; and a silsesquioxane modified with thiol groups.

Examples of the polyhydric alcohol having from 2 to 6 hydroxyl groups in a molecule thereof include an alkanediol having from 2 to 20 carbon atoms, a poly(oxyalkylene) glycol, glycerol, diglycerol, trimethylolpropane, ditrimethylolpropane, pentaerythritol, and dipentaerythritol.

Among the above-exemplified aliphatic polythiols that may include a heteroatom, from the viewpoint of improving the adhesive power, a polythiol in which the portion other than the thiol groups is an aliphatic hydrocarbon, a polythiol obtainable by replacing halogen atoms of a halohydrin adduct of an alcohol by thiol groups, a polythiol that is a hydrogen sulfide reaction product of a polyepoxide compound, a thioglycolic acid ester, a mercapto fatty acid ester, and a thiol isocyanurate compound are preferable; a mercapto fatty acid ester and a thiol isocyanurate compound are more preferable; and a mercapto fatty acid ester is particularly preferable. From similar viewpoints, a thiol that does not include a polysulfide group or a siloxane bond is also preferable.

(Polythiol in which the Portion Other than Thiol Groups is Aliphatic Hydrocarbon)

The polythiol in which the portion other than thiol groups is an aliphatic hydrocarbon is, for example, an alkanedithiol having from 2 to 20 carbon atoms.

Examples of the alkanedithiol having from 2 to 20 carbon atoms include 1,2-ethanedithiol, 1,1-propanedithiol, 1,2-propanedithiol, 1,3-propanedithiol, 2,2-propanedithiol, 1,4-butanedithiol, 2,3-butanedithiol, 1,5-pentanedithiol, 1,6-hexanedithiol, 1,8-octanedithiol, 1,10-decanedithiol, 1-1-cyclohexanedithiol, and 1,2-cyclohexanedithiol.

(Thioglycolic Acid Ester)

Examples of the thioglycolic acid ester include 1,4-butanediol bisthioglycolate, 1,6-hexanediol bisthioglycolate, trimethylolpropane tristhioglycolate, and pentaerythritol tetrakisthioglycolate.

(Mercapto Fatty Acid Ester)

The mercapto fatty acid ester is preferably a β-mercapto fatty acid ester having a primary thiol group, and is more preferably a β-mercaptopropionic acid ester of a polyhydric alcohol having from 2 to 6 hydroxyl groups in a molecule thereof, from the viewpoint of improving the adhesive power. Further, the mercapto fatty acid ester having a primary thiol group preferably has from 4 to 6 thiol groups in one molecule thereof, more preferably has 4 or 5 thiol groups in one molecule thereof, and further preferably has 4 thiol groups in one molecule thereof, from the viewpoint of improving the adhesive power.

Preferable examples of the β-mercaptopropionic acid ester having a primary thiol group include tetraethyleneglycol bis(3-mercaptopropionate) (EGMP-4), trimethylolpropane tris(3-mercaptopropionate) (TMMP), pentaerythritol tetrakis(3-mercaptopropionate) (PEMP), and dipentaerythritol hexakis(3-mercaptopropionate) (DPMP). Among these, PEMP and DPMP are preferable, and PEMP is more preferable.

The β-mercaptopropionic acid ester having a secondary thiol group is, for example, an ester between a polyhydric alcohol having from 2 to 6 hydroxyl groups in a molecule thereof and β-mercaptobutanoic acid, and specific examples thereof include 1,4-bis(3-mercaptobutylyloxy)butane and pentaerythritol tetrakis(3-mercaptobutyrate).

(Thiol Isocyanurate Compound)

The thiol isocyanurate compound, which is obtainable via a reaction between an isocyanurate compound and a thiol, is preferably a thiol isocyanurate compound having a primary thiol group, from the viewpoint of improving the adhesive power. Further, the thiol isocyanurate compound having a primary thiol group preferably has 2 to 4 thiol groups in one molecule thereof, and more preferably has 3 thiol groups in one molecule thereof, from the viewpoint of improving the adhesive power.

The thiol isocynaurate compound having a primary thiol group is preferably tris-[(3-mercaptopropionyloxy)-ethyl]-isocyanurate (TEMPIC).

(Silicone Modified with Thiol Group)

Examples of the silicone modified with thiol groups include mercapto-modified silicone oils such as KF-2001, KF-2004, and X-22-167B (tradenames, manufactured by Shin-etsu Chemical Co., Ltd.), SMS042 and SMS022 (tradenames, manufactured by Gelest Inc.), and PS849 and PS850 (tradenames, manufactured by UCT Inc.).

(Aromatic Polythiol that may Include Heteroatom)

Examples of aromatic polythiols that may be used as the polythiol compound (A) include the aromatic polythiols exemplified below. As described above, the aromatic polythiol may include a heteroatom. Examples of the aromatic polythiols include 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 2,5-toluenedithiol, 3,4-toluenedithiol, 1,3-di(p-methoxyphenyl)propane-2,2-dithiol, 1,3-diphenylpropane-2,2-dithiol, phenylmethane-1,1-dithiol, and 2,4-di(p-mercaptophenyl)pentane.

<<Compound (B) having Plural Epoxy Groups>>

In the present invention, the term "compound having plural epoxy groups" refers to a compound having two or more epoxy groups in one molecule thereof. As the component (B), one compound that has plural epoxy groups may be used singly, or two or more compounds each having plural epoxy groups may be used in combination.

In the component (B), the number of epoxy groups in one molecule thereof is not particularly limited, as long as the above-defined relationship with the total molar number of thiol groups of the component (A) is satisfied. From the viewpoint of improving the adhesive power and the durability of adhesion, the number of epoxy groups in one molecule of the component (B) may be determined, as appropriate, within a range of usually 2 or more, although the number may vary depending on whether the component (B) is a low-molecular-weight compound or a high-molecular-weight compound.

The epoxy equivalent weight of the compound (B) having plural epoxy groups is preferably 3000 or less, more preferably 2000 or less, still more preferably 1000 or less, further more preferably 900 or less, and particularly preferably 800 or less, from the viewpoint of improving the adhesive power. The lower limit of the epoxy equivalent weight of the component (B) is not particularly limited, and is preferably, for example, 50 or more, and more preferably 100 or more. When component (B) is a polymer, the "molecular weight" refers to the styrene-equivalent number average molecular weight.

Examples of the compound (B) having plural epoxy groups include an aromatic epoxide, an aliphatic epoxide, an alicyclic epoxide, and modified products thereof. Among these, an aromatic epoxide having a ring structure other than a glycidyl group, an alicyclic epoxide having a ring structure other than a glycidyl group, and modified products thereof are preferable. From the viewpoint of the strength of the adhesion layer, the aromatic epoxide preferably has two or more aromatic rings. The alicyclic epoxide preferably has three or more aliphatic rings.

Examples of the aromatic epoxide include: bisphenol-type aromatic epoxides such as a bisphenol A-type epoxy compound, a bisphenol F-type epoxy compound, and a bisphenol S-type epoxy compound; novolac resin-type aromatic epoxides such as a phenol novolac-type epoxy compound and a cresol novolac-type epoxy compound; and other aromatic epoxides such as a polyphenol-type epoxy compound, a biphenyl-type epoxy compound, a naphthalene ring-containing epoxy compound, a fluorene-type epoxy compound and an epoxy compound having a urethane skeleton.

Examples of the aliphatic epoxide include a polyalkyleneglycol diglycidyl ether such as trimethyolpropane triglycidyl ether, and a polyglycidyl ether of a polyhydric alcohol such as glycerin.

The alicyclic epoxide is, for example, an alicyclic epoxide such as cyclohexane dimethanol diglycidyl ether or an epoxy compound having a urethane skeleton.

Modified products of the aromatic, aliphatic or alicyclic epoxide include modified products of aromatic epoxides such as a hydrogenated bisphenol A-type epoxy compound, a hydrogenated bisphenol F-type epoxy compound, a hydrogenated biphenyl-type epoxy compound, and a brominated bisphenol-type epoxy compound.

Among them, a cresol novolac-type epoxy compound (for example, JER152 (tradename, manufactured by Mitsubishi Chemical Corporation), which is the following epoxy compound B-1), a bisphenol A-type epoxy compound (for example JER1001B80 (tradename, manufactured by Mitsubishi Chemical Corporation), which is the following epoxy compound B-2, or EP-4100 (tradename, manufactured by ADEKA Corporation), which is the following epoxy compound B-3), an aromatic epoxide of an epoxy compound having a urethane skeleton (for example, the following epoxy compound B-4), an alicyclic epoxide of an epoxy compound having a urethane skeleton (for example, the following epoxy compound B-5), and a hydrogenated bisphenol A-type epoxy compound (for example, EPO-LIGHT4000 (tradename, manufactured by KYOEISHA CHEMICAL Co., Ltd.), which is the following epoxy compound B-6) are preferable.

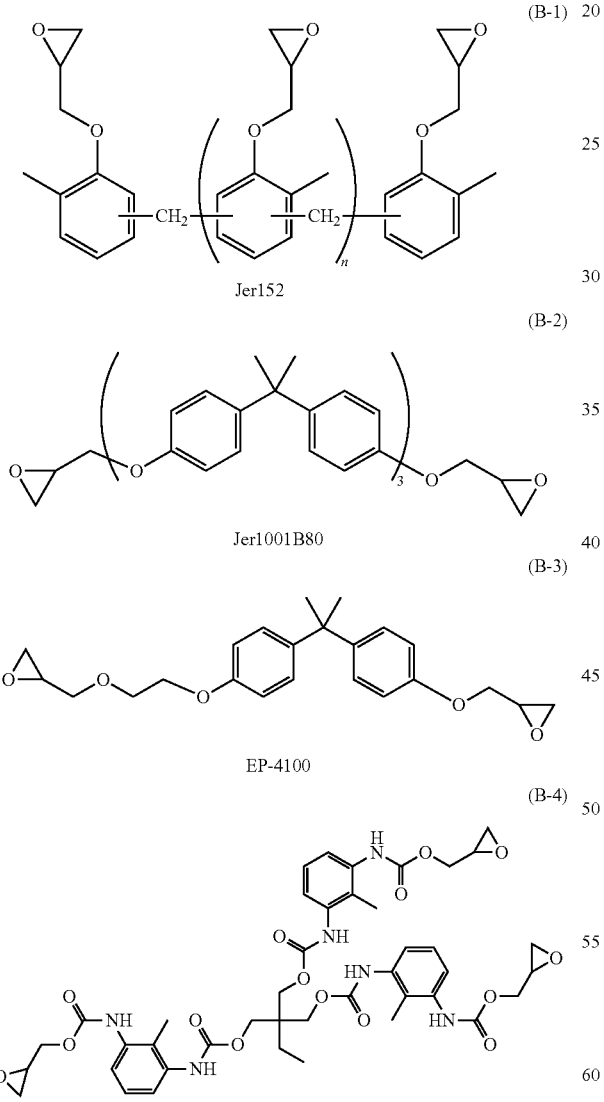

Here, epoxy compound B-4 illustrated above can be synthesized in the following manner. Specifically, epoxy compound B-4 can be synthesized by adding, at 70° C., glycidol (for example, a product of Junsei Chemical Co., Ltd.) to an isocyanate oligomer having a TDI adduct structure (for example, DESMODUR L-75 (tradename) manufactured by Bayer) such that the number of NCO functional groups becomes the same as the number of OH functional groups, and further adding a tin-based catalyst (for example, NEOSTANN U-100 (tradename) manufactured by Nitto Kasei Co., Ltd.) in an amount of 0.05% by mass.

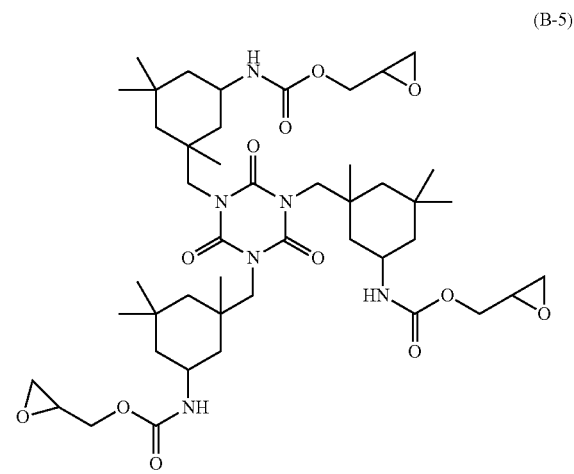 [SMILES: CC1(C)CC(NC(=O)OCC2CO2)CC(C)(Cn2c(=O)n(CC3(C)CC(NC(=O)OCC4CO4)CC(C)(C)C3)c(=O)n(CC3(C)CC(NC(=O)OCC4CO4)CC(C)(C)C3)c2=O)C1]

Here, epoxy compound B-5 illustrated above can be synthesized in the following manner. Specifically, epoxy compound B-5 can by synthesized by adding, at 70° C., glycidol (for example, a product manufactured by Junsei Chemical Co., Ltd.) to an isocyanate oligomer having an IPDI isocyanurate structure (for example, DESMODUR Z4470BA (tradename) manufactured by Bayer) such that the number of NCO functional groups becomes the same as the number of OH functional groups, and further adding a tin-based catalyst (for example, NEOSTANN U-100 (tradename) manufactured by Nitto Kasei Co., Ltd.) in an amount of 0.05% by mass.

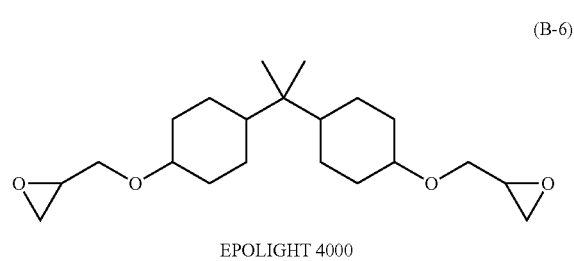 [SMILES: CC(C)(C1CCC(OCC2CO2)CC1)C1CCC(OCC2CO2)CC1]

In the case of using a mercapto fatty acid ester and a thiol isocyanurate compound as the polythiol compound (A), it is preferable to use one ring-structure-containing epoxy compound singly, or two or more ring-structure-containing epoxy compounds in combination, as the compound (B) having plural epoxy groups. Among them, it is more preferable to use one bisphenol A skeleton epoxy compound or urethane bond-containing epoxy compound singly, or two or more selected from the group consisting of bisphenol A skeleton epoxy compounds and urethane bond-containing epoxy compounds in combination.

<<Radical Generator (C)>>

The term "radical generator" refers to a compound that generates a radical when energy from, for example, light or heat is imparted to the compound. The radical generator(s)

(C) to be used may be at least one selected from the group consisting of thermal radical generators and photoradical generators. Among them, thermal radical generators are preferable, and thermal radical generators including a peroxide are more preferable, from the viewpoints of improving the adhesive power and enabling the adhesion of a light-nontransmissive rubber. Examples of the thermal radical generators including a peroxide include thermal radical generators including an organic peroxide and thermal radical generators including an inorganic peroxide. Thermal radical generators including an organic peroxide are more preferable.

One radical generator may be used singly as the radical generator (C), or two or more radical generators may be used in combination as the radical generator (C).

The thermal radical generator(s) including an organic peroxide to be used is, for example, at least one selected from the group consisting of t-butyl peroxy-2-ethylhexanoate, dilauroyl peroxide, 1,1,3,3-tetramethylbutyl peroxy-2-ethylhexanoate, 1,1-di(t-hexylperoxy)cyclohexanone, di-t-butyl peroxide, t-butyl cumyl peroxide, 1,1-di(t-hexylperoxy)-3,3,5-trimethylcyclohexane, t-amyl peroxy-2-ethylhexanoate, di(2-t-butylperoxyisopropyl)benzene, di(t-butyl) peroxide, 1,1'-di(2-t-butylperoxyisopropyl)benzene, peroxybenzoyl, 1,1-di(t-butylperoxy)cyclohexane, di(3,5,5-trimethylhexanoyl)peroxide, t-butyl peroxyneodecanoate, t-hexyl peroxyneodecanoate, and dicumyl peroxide. Among these, the thermal radical generator(s) including an organic peroxide is preferably at least one selected from the group consisting of t-butyl peroxy-2-ethylhexanoate, dilauroyl peroxide, 1,1,3,3-tetramethylbutyl peroxy-2-ethylhexanoate, 1,1-di(t-hexylperoxy)cyclohexanone, di-t-butyl peroxide and t-butyl cumyl peroxide. One thermal radical generator including an organic peroxide may be used singly, or two or more thermal radical generators each including an organic peroxide may be used in combination.

The thermal radical generator including an inorganic peroxide is, for example, a redox radical generator composed of a combination of an oxidant and a reductant, such as a combination of a hydrogen peroxide and an iron (II) salt or a combination of a persulfuric acid salt and sodium hydrogen sulfite. One thermal radical generator including an inorganic peroxide may be used singly, or two or more thermal radical generators each including an inorganic peroxide may be used in combination.

Known photoradical generators may widely be used, without particular limitations.

The photoradical generator is, for example, an intramolecular fission-type photoradical generator, and examples thereof include: benzoin alkyl ether-based photoradical generators such as benzoin ethyl ether, benzoin isobutyl ether, and benzoin isopropyl ether; acetophenone-based photoradical generators such as 2,2-diethoxyacetophenone and 4'-phenoxy-2,2-dichloroacetophenone; propiophenone-based photoradical generators such as 2-hydroxy-2-methylpropiophenone, 4'-isopropyl-2-hydroxy-2-methylpropiophenone, and 4'-dodecyl-2-hydroxy-2-methylpropiophenone; benzil dimethyl ketal; 1-hydroxycyclohexyl phenyl ketone; anthraquinone-based photoradical generators such as 2-ethylanthraquinone and 2-chloroanthraquinone; and acylphosphine oxide-based photoradical generators.

Further examples include hydrogen abstraction-type photoradical generators such as benzophenone/amine-based photoradical generators, Michiller's ketone/benzophenone-based photoradical generators, and thioxanthone/amine-based photoradical generators. Non-extractable photoradical generators are also usable for avoiding migration of unreacted portion of photoradical generator. Examples thereof include a polymerized acetophenone-based radical generator and a substance obtainable by adding a double bond of an acryl group to benzophenone.

The photoradical generator, such as those described above, may be used singly, or in combination of two or more thereof.

<<Amine-Based Catalyst (D)>>

In the present invention, the term "amine-based catalyst" refers to a catalyst that has an amine skeleton and that contributes to the reaction of abstracting a proton from a thiol group in the polythiol compound (A). The reaction of abstracting a proton is an initiation reaction for anionic polymerization between thiol groups and epoxy groups.

The amine-based catalyst is, for example, a diamine, and specific examples thereof include bis(2-dimethylaminoethyl) ether, N,N,N', N'-tetramethyl hexamethylenediamine, triethylenediamine (TEDA), benzyl dimethyl amine, 2,2'-dimorpholinoethyl ether, and N-methylmorpholine. Among these, triethylenediamine (TEDA) is preferable. The catalyst, such as those described above, may be used singly, or in combination of two or more thereof.

<<Optional Components>>

The composition forming the adhesive composition layer of the adhesive sheet may be prepared such that the composition further includes optional components. Examples of optional components include urethanization catalysts, surface conditioners, solvents, binders, fillers, pigment dispersants, electric conductivity imparting agents, ultraviolet absorbers, antioxidants, anti-drying agents, penetrants, pH adjusters, metal chelating agents, mildewproof agents, antibacterial agents, surfactants, plasticizers, waxes, and leveling agents.

(Surface Conditioner (E))

The composition forming the adhesive composition layer of the adhesive sheet may further include a surface conditioner (hereinafter also referred to as "surface conditioner (E)"), as necessary. Any surface conditioner may be used as the surface conditioner (E). Examples of the surface conditioner include acrylic surface conditioners, vinyl-based surface conditioners, silicone-based surface conditioners, fluorine-based surface conditioners and silicone acrylate-based surface conditioners. Among these, silicone acrylate-based surface conditioners are preferable from the viewpoints of compatibility and the ability to decrease surface tension.

(Solvent)

The composition forming the adhesive composition layer of the adhesive sheet may be prepared such that the composition includes a solvent, as necessary. The solvent may be any solvent that does not react with other components, without particular limitation. Examples thereof include aromatic solvents and aliphatic solvents.

Specific examples of the aromatic solvents include toluene and xylene. Examples of the aliphatic solvents include hexane, methyl ethyl ketone (MEK), and butyl acetate.

(Other Components)

The composition forming the adhesive composition layer of the adhesive sheet may include a compound that includes a carbon-carbon double bond, as an optional component.

However, a high content of the compound that includes a carbon-carbon double bond results in a reaction between the polythiol compound (A) and the compound that includes a carbon-carbon double bond. This reaction makes it difficult for the polythiol compound (A) and a carbon-carbon double bond in the rubber to undergo a thiol-ene reaction in some cases, and may decrease the adhesive power of the adhesive sheet with respect to the rubber. Or, a high content of the compound that includes a carbon-carbon double bond may make difficult the occurrence of a chemical bonding reaction between a sulfur atom of a thiol group of the polythiol compound (A) and a carbon atom in a carbon-carbon bond due to a hydrogen abstraction reaction from the main chain of the rubber formed by carbon-carbon bonds, and may decrease the adhesive power of the adhesive sheet with respect to the rubber. Therefore, the ratio of the total molar number of carbon-carbon double bonds contained in the contained carbon-carbon double bond-containing compound relative to the total molar number of thiol groups contained in the contained polythiol compound (A) (carbon-carbon double bonds/thiol groups) is preferably lower than 0.4, preferably lower than 0.1, more preferably 0.08 or lower, still more preferably 0.05 or lower, and particularly preferably 0.01 or lower.

Here, the total molar number of carbon-carbon double bonds contained in the contained carbon-carbon double bond-containing compound can be obtained by multiplying the molar number of the contained compound by the number of carbon-carbon double bonds contained in one molecule of the compound.

The molar ratio (carbon-carbon double bonds/thiol groups) can be obtained by dividing the obtained total molar number of contained carbon-carbon double bonds by the total molar number of thiol groups contained in the contained polythiol compound (A).

<<Contents of Individual Components>>

The ratio (Ep/SH) of the total molar number (Ep) of epoxy groups contained in the compound (B) having plural epoxy groups to the total molar number (SH) of thiol groups contained in the polythiol compound (A) is higher than 0.20 but lower than 1.00. When the epoxy groups/thiol groups ratio is 0.20 or lower, a sufficiently strongly cured adhesive sheet is not obtained, and the adhesive power to rubber decreases. Further, when the epoxy groups/thiol groups ratio is 1.00 or higher, the amount of thiol groups in the component (A) is small relative to the amount of epoxy groups in the component (B), as a result of which the thiol-ene reaction between thiol groups and carbon-carbon double bonds in the rubber does not sufficiently proceed, the adhesive sheet does not tightly adhere to the rubber, and the adhesive power decreases. Therefore, the epoxy groups/thiol groups ratio is preferably 0.25 or higher, preferably 0.8 or lower, and preferably from 0.3 to 0.7. In some embodiments, the lower limit of the ratio (Ep/SH) is 0.20, 0.25, 0.30, 0.40, 0.50, 0.55, 0.60, 0.70 or 0.80, and the upper limit is a value greater than the lower limit and is 0.80, 0.70, 0.60, 0.55, 0.50, 0.40, 0.30 or 0.25.

The total molar number (SH) of thiol groups contained in the polythiol compound (A) can be obtained by multiplying the molar number of the polythiol compound (A) by the number of thiol groups contained in one molecule of the polythiol compound (A). In other words, the total molar number (SH) of thiol groups contained in the polythiol compound (A) refers to the total amount of thiol groups contained in the total amount of polythiol compound (A) contained in the above-described composition, and does not refer to the number of thiol groups contained in one molecule of the polythiol compound.

Further, the total molar number (Ep) of epoxy groups contained in the compound (B) having plural epoxy groups can be obtained by dividing the content thereof by the theoretical molecular weight thereof, and multiplying the obtained value by the number of epoxy groups contained in one molecule of the compound (B) having plural epoxy groups. In other words, the total molar number (Ep) of epoxy groups contained in the compound (B) having plural epoxy groups refers to the total amount of epoxy groups contained in the total amount of compound (B) having plural epoxy groups contained in the above-described composition, and does not refer to the number of epoxy groups contained in one molecule of the compound having plural epoxy groups.

When the compound (B) having plural epoxy groups is an epoxy resin, the number of epoxy groups contained in one molecule of the compound (B) having plural epoxy groups can be calculated using the following method.

Specifically, the epoxy equivalent weight of the epoxy resin (the mass of the resin that includes one equivalent of epoxy groups) is measured using the method according to Japanese Industrial Standards (JIS) K7236:2001. The number average molecular weight of the epoxy resin is divided by the obtained epoxy equivalent weight to calculate the number of epoxy groups contained in one molecule of the component (B). Here, the number average molecular weight refers to a styrene-equivalent number average molecular weight. The number average molecular weight of the epoxy resin can be obtained using a chromatographic method.

When it is desired to obtain the total molar number (SH) of thiol groups or the total molar number (Ep) of epoxy groups after the composition has been prepared or after the adhesive composition layer or the adhesion layer has been formed, the molecular structures and the contents of the component (A) and the component (B) contained in the composition (the composition before it forms the adhesive composition layer or the adhesion layer) can be determined using known measurement methods, such as an NMR measurement or an IR measurement, and then the values of SH and Ep can be obtained using the method described above.

The ratio of the total molar number of the contained radical generator (C) to the total molar number of thiol groups contained in the polythiol compound (A) (radical generator (C)/thiol groups) is preferably 0.025 or higher. When the ratio is 0.025 or higher, the composition is able to exhibit sufficient adhesive power. From the same viewpoint, the ratio (radical generator (C)/thiol groups) is preferably 0.03 or higher, more preferably 0.035 or higher, and particularly preferably 0.04 or higher. From the viewpoint of the improvement in adhesive power, the ratio (radical generator (C)/thiol groups) is preferably 0.5 or lower, more preferably 0.45 or lower, and particularly preferably 0.4 or lower.

The content of the amine-based catalyst (D) in the composition forming the adhesive composition layer of the adhesive sheet is preferably 0.005 parts by mass to 5 parts by mass, more preferably from 0.01 parts by mass to 4 parts by mass, and particularly preferably from 0.05 parts by mass to 3.5 parts by mass, relative to 100 parts of the polythiol compound (A), from the viewpoint of increasing the adhesive power by sufficiently promoting the reaction between the polyol compound (A) and the compound (B) having plural epoxy groups.

As described above, the composition forming the adhesive composition layer of the adhesive sheet may be prepared such that the composition includes optional components (for example, the surface controlling agent (E), the compound that includes a carbon-carbon double bond, or the solvent) in addition to the components (A) to (D). However, from the viewpoint of strongly adhering to rubber, particularly to vulcanized rubber, the total content of the components (A) to (D), excluding solvents, in the composition forming the adhesive composition layer of the adhesive sheet is preferably 80% by mass or higher, more preferably 90% by mass or higher, still more preferably 95% by mass or higher, and further preferably 98% by mass or higher, with respect to the total amount, excluding solvents, of the composition.

From the same viewpoint, the total content of the components (A) to (E), excluding solvents, in the composition is preferably 90% by mass or higher, more preferably 95% by mass or higher, still more preferably 99% by mass or higher, and further preferably 100% by mass, with respect to the total amount, excluding solvents, of the composition.

<Adhesive Composition Layer>

The adhesive composition layer in the present specification is a layer obtained by polymerizing the component (A) and the component (B) in the composition including the components (A) to (D), as described above. Since the adhesive composition layer includes thiol groups and the radical generator (C), the adhesive composition layer exhibits high adhesive power particularly to rubber through thiol-ene reactions.

The thickness of the adhesive composition layer may be selected, as appropriate, in accordance with, for example, the object to which the adhesive composition layer is to be adhered, or the required adhesive power. The thickness of the adhesive composition layer is, for example, from 20 to 1000 µm preferably from 30 to 300 µm and more preferably from 30 to 200 µm.

The size of the adhesive composition layer may be selected, as appropriate, in accordance with, for example, the object to which the adhesive composition layer is to be adhered, or the required adhesive power.

<Support>

The adhesive sheet may be formed, for example, by applying a composition including the above-described components (A) to (D) to a support to form a coating film, and polymerizing the component (A) and the component (B) in the coating film.

Examples of the support include sheet-shaped supports, for example, release sheets such as release paper or release films. Examples of materials that may be used in the sheet-shaped support include paper, resins, resin-coated paper, and metals.

For example, examples of resin release sheet materials include: polyester-based resins such as polyethylene terephthalate, polycyclohexylene terephthalate, and polyethylene naphthalate; polyamide-based resins such as NYLON 46, modified NYLON 6T, NYLON MXD6 and polyphthalamide; ketone-based resins such as polyphenylene sulfide and polythioether sulfone; and sulfone-based resins such as polysulfone and polyether sulfone. Other than those listed above, transparent resin substrates containing an organic resin such as polyether nitrile, polyarylate, polyether imide, polyamideimide, polycarbonate, polymethyl methacrylate, triacetyl cellulose, polystyrene, or polyvinyl chloride as a main component may also be used suitably as release sheets.

The support is not limited to the sheet-shaped supports described above, and any support may be used as long as the adhesive composition layer can be formed on a surface of the support. For example, the adhesive composition layer in the present specification may be formed on a supporting base as a support. In this matter, the thickness and the shape of the support may appropriately be designed in accordance with, for example, the shape of the adhesive composition layer to be formed.

<Method of Producing Adhesive Sheet>

A method of producing the adhesive sheet includes an application process of applying a composition including the polythiol compound (A), the compound (B) having plural epoxy groups, the radical generator (C) and the amine-based catalyst to a support to form a coating film, and a polymerization process of polymerizing the polythiol (A) and the compound (B) having plural epoxy groups in the coating film. In other words, the adhesive sheet is produced by shaping the composition including the components (A) to (D) so as to form the adhesive composition layer.

The method of producing the adhesive sheet includes at least the application process and the polymerization process, and may further include a preparation process of preparing the composition and a release process of releasing the adhesive composition layer from the support.

—Preparation Process—

The method of producing the adhesive sheet may include the preparation process. In the preparation process, for example, the components (A) to (D) are mixed to prepare a composition.

—Application Process—

In the application process, the composition is applied to a support to form a coating film (film of the composition). Examples of a method employed for applying the composition to a surface of the support include coating methods such as a spray coating method, a dip coating method and a spin coating method. However, the method employed for applying the composition to a surface of the support is not particularly limited. The thickness, shape, size and the like of the formed coating film may be designed, as appropriate, in accordance with the thickness, shape, size and the like of the desired adhesive composition layer.

—Polymerization Process—

In the polymerization process, the component (A) and the component (B) in the coating film are polymerized, thereby converting the coating film into the adhesive composition layer. In other words, in the polymerization process, shape maintaining properties are imparted, by polymerization, to the coating film (film of the composition) formed on the support, thereby obtaining the adhesive composition layer. Specifically, in the polymerization process, it is conceivable that thiol groups of the component (A) and epoxy groups of the component (B) in the coating film (composition) undergo an anionic polymerization reaction, whereby the adhesive composition layer is maintained in a sheet shape.

A method employed for polymerizing the component (A) and the component (B) in the coating film in the polymerization process is, for example, a method including leaving the coating film to stand at normal temperature after the formation of the coating film. Alternatively, the adhesive composition layer may be formed by heating the coating film to a degree at which radical reactions due to the radical generator do not start, after the formation of the coating film.

The duration of the polymerization process may be adjusted depending on the amount of the amine-based catalyst. From the viewpoints of the handling properties at the time of forming the adhesive composition layer and impartment of shape maintaining properties to a degree at which the sheet shape of the adhesive composition layer is maintained at the time of adhering operation (at the time of forming the layered body), the duration of the polymerization process is preferably 1 minute or more, and more preferably 3 minutes or more.

With respect to the temperature of the coating film in the polymerization process, the coating film can usually be formed into a sheet at room temperature. However, heating may be performed to a degree that cleavage does not occur in the radical generator contained in the material. From the above viewpoints, the temperature of the coating film in the polymerization process is preferably from 0 to 60° C., and more preferably from 15 to 40° C.

—Release Process—

The above-described method of producing the adhesive sheet may further include a release process of releasing the adhesive composition layer from the support. Specifically, when a sheet-shaped support is used as the support, for example, an adhesive sheet configured to include the support and the adhesive composition layer can be obtained through the application process and the polymerization process, and, an adhesive sheet formed of the adhesive composition layer released from the support can be obtained as a result of further performing the release process. When a supporting base or the like is used as the support, for example, an adhesive sheet formed of the adhesive composition layer released from the support can be obtained as a result of performing the application process and the polymerization process, and, further, the release process.

As described above, the adhesive composition layer of the adhesive sheet is able to exhibit high adhesive power to rubber. Therefore, the adhesive sheet is particularly suitable for adhesion to rubber, as described below, and can suitably be used in a layered body of a rubber layer and an adhesion layer. However, the applications of the adhesive sheet are not limited thereto, and the adhesive sheet can also be used, for example, in coating applications in which colored particles or the like are added to the composition in order to impart decoration or the like.

[Layered Body]

The layered body according to an embodiment of the present invention includes, in the recited order, a rubber layer, an adhesion layer formed using the adhesive composition layer of the adhesive sheet described above, and another layer. In other words, the layered body is a layered body which includes plural layers adhered to one another, and in which at least one of the layers is a rubber layer, and in which the rubber layer is adhered to an adjacent layer via an adhesion layer formed using the adhesive composition layer of the adhesive sheet. With respect to the rubber layer and the another layer that are adhered via the adhesion layer, the entire adhesion face of the rubber layer and/or the entire adhesion face of the another layer may be adhered via the adhesion layer, or only a part of the adhesion face of the rubber layer and/or only a part of the adhesion face of the another layer may be adhered via the adhesion layer. The layered body according to the present invention may have a configuration in which three or more layers, including a rubber layer, are layered with the adhesion layer(s) according to the present disclosure disposed therebetween. This configuration is not limited to a configuration in which all of the layers are adhered to one another via the adhesion layer according to the present disclosure.

The another layer may be a rubber layer, or a layer other than a rubber layer, such as a glass layer, a metal layer or a resin layer.

The dimensions of each layer and the number of layers may be selected, as appropriate, in accordance with the purpose.

<Rubber Layer>

The rubber layer may be formed from vulcanized rubber or unvulcanized rubber. The rubber constituting the rubber layer preferably has a carbon-carbon double bond. In this case, it is surmised that a carbon atom of a carbon-carbon double bond contained in the rubber layer contacting the adhesion layer forms a carbon-sulfur bond with a sulfur atom of a thiol group of the polythiol compound (A) contained in the adhesive sheet.

However, it is surmised that a layered body can be obtained even when the rubber constituting the rubber layer does not have a carbon-carbon double bond. In this case, it is surmised that a sulfur atom of a thiol group of the polythiol compound (A) and a carbon atom of a carbon-carbon bond chemically binds to each other via a hydrogen abstraction reaction in which the polythiol compound (A) pulls out hydrogen from the main chain formed by carbon-carbon bonds present in the rubber. However, from the viewpoint of improving the adhesive power, it is preferable that the rubber constituting the rubber layer has a carbon-carbon double bond.

The material of the rubber layer is not particularly limited, and examples thereof include: natural rubber (NR); conjugated diene synthetic rubbers, such as polyisoprene synthetic rubber (IR), polybutadiene rubber (BR), styrene-butadiene copolymer rubber (SBR), acrylonitrile butadiene rubber (NBR), chloroprene rubber (CR), and butyl rubber (IIR); ethylene-propylene copolymer rubber (EPM); ethylene-propylene-diene copolymer rubber (EPDM); and polysiloxane rubber. Materials for the rubber layer, such as those described above, may be used singly or in combination of two or more thereof. Among those described above, natural rubber (NR), and a combination of natural rubber and a styrene-butadiene copolymer rubber (SBR/NR), are preferable.

<Layer other than Rubber Layer>

Examples of the layer other than the rubber layer include a glass layer, a metal layer, and a resin layer. Strong adhesion of a metal layer or a resin layer to the rubber layer can be achieved by using the above-described adhesive sheet.

<Method of Producing Layered Body>

Next, a method of producing a layered body using the adhesive sheet is described. First, the adhesive composition layer of the adhesive sheet is disposed between at least one rubber layer and another layer (a rubber layer or a layer other than a rubber layer) that faces the rubber layer, thereby obtaining a stacked body.

Specifically, for example, one face of the adhesive composition layer is contacted with the adhesion face of the rubber layer, to attach the adhesive composition layer to the adhesion face of the rubber layer. Then, the adhesion face of another layer that is to face the rubber layer is contacted with the other face of the adhesive composition layer (the face not contacting the adhesion face of the rubber layer), to obtain a stacked body (i.e., a stacked body including the rubber layer, the adhesive composition layer and the another layer in this order).

When an adhesive sheet formed of the adhesive composition layer is used, the process of attaching the adhesive composition layer to the adhesion face of the rubber layer may include bringing one face of the adhesive sheet into contact with the adhesion face of the rubber layer. When an adhesive sheet including a support and the adhesive composition layer is used, a face of the adhesive composition layer of the adhesive sheet (a face not contacting with the support) may be contacted with the adhesion face of the rubber layer, the face of the adhesive composition layer being opposite to an adhesive composition layer face that contacts with the support.

When an adhesive sheet formed of the adhesive composition layer is used, the process of bringing the adhesion face of the another layer into contact with the adhesive composition layer may include bringing the adhesion face of the another layer into contact with a face of the adhesive composition layer (a face not contacting with the rubber layer), the face of the adhesive composition layer being opposite to an adhesive composition layer face contacting with the rubber layer. When an adhesive sheet including a support and the adhesive composition layer is used, the support of the adhesive sheet attached to the rubber layer may be released from the adhesive composition layer, and thereafter the adhesion face of the another layer may be contacted with an adhesive composition layer face that was in contact with the support (a face opposite to a face contacting with the rubber layer).

In the above explanation of the method employed for obtaining the stacked body, a method including bringing the another layer into contact with the adhesive composition layer after the adhesive composition layer is attached to the rubber layer is described. However, the method employed for obtaining the stacked body is not limited thereto. Specifically, when the another layer is a layer other than a rubber layer, the adhesive composition layer may be attached to the adhesion face of the another layer beforehand, and then the adhesion face of the rubber layer may be contacted with the adhesive composition layer to obtain the stacked body. Further, the adhesive composition layer may be attached to each of the rubber layer and the another layer, and then the adhesive composition layers may be contacted with each other, thereby obtaining a stacked body including the rubber layer, the first adhesive composition layer, the second adhesive composition layer and the another layer in this order.

After the stacked body is obtained, a layered body can suitably be produced by curing (performing the adhesion treatment) while applying, if necessary, a pressing pressure to the stacked body in the thickness direction of the stacked body.

In the case of applying a pressing pressure to the stacked body, the pressing pressure is preferably from 0.1 MPa to 5.0 MPa, more preferably from 0.4 MPa to 4.0 MPa, and particularly preferably from 0.5 MPa to 3.0 MPa, from the viewpoint of enhancing the adhesive power. The pressing time is preferably from 5 to 120 minutes, more preferably from 10 to 60 minutes, and particularly preferably from 15 to 45 minutes.

When the adhesive composition layer of the adhesive sheet includes a thermal radical generator as a radical generator, the adhering of the adhesive composition layer and the rubber layer or the like is preferably performed by heating. A temperature at which the thermal radical generator generates radicals efficiently may appropriately selected as the heating temperature, and the heating temperature is preferably a temperature that is within about ±30° C. from the temperature at which the half-life of the thermal radical generator is one minute.

When the adhesive composition layer of the adhesive sheet includes a photoradical generator as a radical generator, the adhering of the adhesive composition layer and the rubber layer or the like is preferably performed by photoirradiation. A ultraviolet (UV) lamp may preferably be used as the light source from the viewpoints of improving the adhesive power and reducing costs. From the same viewpoint, the photoirradiation time may be preferably from several seconds to several tens of seconds.

EXAMPLES

The present invention is described below in further details by reference to examples. However, the present invention is not limited to the following examples.

[Raw Materials]
The following materials were used as raw materials.
<Polythiol Compound (A) (Component (A))>
Pentaerythritol tetrakis(3-mercaptopropionate) (PEMP): a product manufactured by SC Organic Chemical Co., Ltd.
<Compound (B) having Plural Epoxy Groups (Component (B))>
Cresol-novolac-type epoxy compound: JER152 (tradename) manufactured by Mitsubishi Chemical Corporation
Bisphenol A-type Epoxy Compound: JER1001B80 (tradename) manufactured by Mitsubishi Chemical Corporation
Bisphenol A-type Epoxy Compound: EP-4100 (tradename) manufactured by ADEKA CORPORATION
Hydrogenated bisphenol A-type epoxy compound: EPO-LIGHT4000 (tradename) manufactured by KYOEISHA CHEMICAL Co., Ltd.
Epoxy Compound B-4 illustrated above
Epoxy Compound B-5 illustrated above
<Radical Generator (C) (Component (C))>
t-butyl peroxy-2-ethylhexanoate: PERBUTYL O (tradename) manufactured by NOF CORPORATION
<Amine-based Catalyst (D) (Component (D))>
Triethylene diamine (TEDA)
<Surface Conditioner (E) (Component (E))>
Silicone acrylate-based surface conditioner: SIU2400 (tradename) manufactured by Toyo Chemicals Co., Ltd.

[Measurement of Total Molar Number (SH) of Thiol Groups]
The total molar number of thiol groups contained in the polythiol compound (A) was obtained by calculation by dividing the formulated amount by the theoretical molecular weight, and multiplying the obtained value by the number of thiol groups contained in one molecule of the polythiol compound (A).

[Measurement of Total Molar Number (Ep) of Epoxy Groups]
Among the compounds for the component (B), the total molar number (Ep) of epoxy groups contained in JER152 as the component (B) was obtained by calculation based on the method according to JIS K7236:2001 mentioned above. For the other compounds used as the component (B), the total molar number (Ep) of epoxy groups was obtained by calculation by dividing the formulated amount mentioned above by the theoretical molecular weight, and multiplying the obtained value by the number of epoxy groups contained in one molecule of the compound (B).

[Production of Rubber]
Rubber (having a length of 100 mm, a width of 25 mm, and a thickness of 3 mm) was produced from the formulation indicated in the following Table 1.

TABLE 1

| | | Type of Rubber | |
| --- | --- | --- | --- |
| | | NR/SBR | NR |
| Formulation | NR | 15 | 100 |
| | SBR | 85 | — |
| | Carbon Black | 50 | 50 |
| | Stearic Acid | 2 | 2 |
| | Anti-aging Agent | 1 | 1 |
| | Zinc Oxide | 3 | 3 |
| | Vulcanization Accelerator 1 | 0.4 | 0.4 |
| | Vulcanization Accelerator 2 | 0.2 | 0.2 |
| | Sulfur | 1.4 | 1.4 |

*Numbers in the table indicate parts by mass

The specifics of the individual components noted in Table 1 are as follows.

Natural Rubber (NR): RSS#3

Styrene-butadiene Copolymer Rubber (SBR):
  JSR1500 (tradename) manufactured by JSR CORPORATION Anti-aging Agent: N-phenyl-N'-(1,3-dimethylbutyl)-p-phenylenediamine (NOCRAC 6C (tradename) manufactured by OUCHI SHINKO CHEMICAL INDUSTRIAL CO., LTD.)

Vulcanization Accelerator 1:
  1,3-diphenylguanidine (NOCCELER D (D-P) (tradename) manufactured by OUCHI SHINKO CHEMICAL INDUSTRIAL CO., LTD.)

Vulcanization Accelerator 2:
  di-2-benzothiazolyl disulfide (NOCCELER DM-P (DM) (tradename) manufactured by OUCHI SHINKO CHEMICAL INDUSTRIAL CO., LTD.)

Examples and Comparative Examples

In Examples 1 to 16 and Comparative Examples 1 to 5, in which the NR/SBR was used as rubber, the relationship between the adhesive power and the ratio (epoxy groups/thiol groups) of the total molar number of epoxy groups contained in the formulated amount of the compound (B) having plural epoxy groups to the total molar number of thiol groups contained in the formulated amount of the polythiol compound (A) was studied by changing the ratio (epoxy groups/thiol groups).

In Examples 17 to 30 and Comparative Examples 6 to 14, in which the NR was used as rubber, the relationship between the adhesive power and the ratio (epoxy groups/thiol groups) was studied in the same manner as in Examples 1 to 16 and Comparative Examples 1 to 5, except that the rubber (the NR/SBR), which was employed in Examples 1 to 16 and Comparative Examples 1 to 5, was replaced by another rubber (the NR).

Next, the Examples and Comparative Examples will be specifically described.

Examples 1 to 16 and Comparative Examples 1 to 5>(in which NR/SBR was Used as Rubber)

A composition obtained by mixing the ingredients of (A) to (E) described above according to the formulation indicated in Table 2 (the number for each ingredient representing the parts by mass of non-volatile portion) was formed on a release sheet, thereby obtaining an adhesive sheet including a 100 μm-thick adhesive composition layer. The NR/SBR was used as the rubber.

The adhesive composition layer of the obtained adhesive sheet was sandwiched between two rubber sheets (rubber substrates) to form a stacked body, and the stacked body was heated to form a layered body. The heating was performed by maintaining the stacked body at a temperature of 150° C. while applying a pressing pressure of 2.5 MPa for 20 minutes. Then, the adhesive power of the adhesion layer formed using the adhesive composition layer as described above was measured. The results thereof are indicated in Table 2. Here, a solvent such as methyl ethyl ketone or butyl acetate was added, if necessary, to systems in which compound B-4 or B-5 is used.

[Method Employed for Measurement of Adhesive Power of Adhesion Layer]

The opposite ends of the adjacent rubber substrates in the layered body were pulled away from each other (in the directions normal to the principal faces of the rubber substrates, the directions forming an angle of)180° at a pulling rate of 50 mm/min., and the delamination strength (N/25 mm) was measured and used as an indicator of the adhesive power.

With respect to the adhesive power, a delamination strength of 100 N/25 mm or greater indicates that a sufficient adhesive power at a level at which the rubber substrate breaks before delamination occurs is obtained. The delamination strength is preferably 300 N/25 mm or greater. In contrast, a delamination strength of less than 100 N/25 mm indicates that the reaction at the interface between the rubber substrate and the adhesion layer has not proceeded sufficiently, and delamination would occur at the interface or the adhesion layer itself would undergo cohesive failure due to insufficient cohesive force of the adhesion layer. Occurrence of such a phenomenon indicates that the adhesive power is insufficient.

Examples 17 to 30 and Comparative Examples 6 to 14>(in which NR was Used as Rubber)

Ingredients were mixed according to the formulation indicated in the following Tables 3 and 4 (the number for each ingredient indicating the parts by mass of non-volatile portion), to obtain a composition, and an adhesive sheet was prepared from the obtained composition.

A layered body was prepared using the obtained adhesive sheet in the same manner as described above, and the adhesive power of the adhesion layer of the layered body was measured in the same manner as described above. The NR was used as the rubber. The results thereof are indicated in Tables 3 and 4. In the systems in which compound B-4 or B-5 is used, a solvent such as methyl ethyl ketone or butyl acetate was added, if necessary.

TABLE 2

| Composition | Component (A) PEMP (% by mass) | Component (B) JER152 (% by mass) | Component (B) JER1001 B80 (% by mass) | Component (B) EP-4100 (% by mass) | Component (B) B-5 (% by mass) | Component (B) B-4 (% by mass) | Component (C) PERBUTYLO (% by mass) | Component (D) TEDA (% by mass) | Component (E) SIU2400 (% by mass) | Epoxy Groups/Thiol Groups (Molar Ratio) | Component (C)/Thiol Groups (Molar Ratio) | Evaluation Adhesive Power (N/25 mm) |
|---|---|---|---|---|---|---|---|---|---|---|---|---|
| Comp. Ex. 1 | 42.29 | — | — | — | 33.00 | — | 22.46 | 1.40 | 0.85 | 0.20 | 0.3 | 30.994 |
| Example 1 | 39.07 | — | — | — | 38.11 | — | 20.75 | 1.29 | 0.78 | 0.25 | 0.3 | 453.86 |
| Example 2 | 40.21 | — | 37.51 | — | — | — | 21.35 | 0.13 | 0.80 | 0.30 | 0.3 | 435.65 |
| Example 3 | 36.30 | — | — | — | 42.49 | — | 19.28 | 1.20 | 0.73 | 0.30 | 0.3 | 523.46 |
| Example 4 | 38.18 | — | — | — | — | 39.53 | 20.27 | 1.26 | 0.76 | 0.40 | 0.3 | 457.33 |
| Example 5 | 44.04 | 31.54 | — | — | — | — | 23.39 | 0.15 | 0.88 | 0.50 | 0.3 | 635.83 |

TABLE 2-continued

| Composition | Component (A) PEMP (% by mass) | Component (B) JER152 (% by mass) | JER1001 B80 (% by mass) | EP-4100 (% by mass) | B-5 (% by mass) | B-4 (% by mass) | Component (C) PERBUTYLO (% by mass) | Component (D) TEDA (% by mass) | Component (E) SIU2400 (% by mass) | Epoxy Groups/ Thiol Groups (Molar Ratio) | Component (C)/Thiol Groups (Molar Ratio) | Evaluation Adhesive Power (N/25 mm) |
|---|---|---|---|---|---|---|---|---|---|---|---|---|
| Example 6 | 32.16 | — | 50.01 | — | — | — | 17.08 | 0.11 | 0.64 | 0.50 | 0.3 | 745.84 |
| Example 7 | 42.88 | — | — | 33.34 | — | — | 22.78 | 0.14 | 0.86 | 0.50 | 0.3 | 392.23 |
| Example 8 | 34.74 | — | — | — | — | 44.97 | 18.45 | 1.15 | 0.69 | 0.50 | 0.3 | 251.36 |
| Example 9 | 41.50 | — | — | 35.49 | — | — | 22.04 | 0.14 | 0.83 | 0.55 | 0.3 | 249.99 |
| Example 10 | 41.43 | 35.60 | — | — | — | — | 22.00 | 0.14 | 0.83 | 0.60 | 0.3 | 364.28 |
| Example 11 | 29.24 | — | 54.55 | — | — | — | 15.53 | 0.10 | 0.58 | 0.60 | 0.3 | 631.58 |
| Example 12 | 39.11 | 39.21 | — | — | — | — | 20.77 | 0.13 | 0.78 | 0.70 | 0.3 | 210.82 |
| Example 13 | 26.80 | — | 58.34 | — | — | — | 14.23 | 0.09 | 0.54 | 0.70 | 0.3 | 634.27 |
| Example 14 | 37.84 | — | — | 41.18 | — | — | 20.10 | 0.12 | 0.76 | 0.70 | 0.3 | 360.55 |
| Example 15 | 24.74 | — | 61.55 | — | — | — | 13.14 | 0.08 | 0.49 | 0.80 | 0.3 | 365.17 |
| Example 16 | 35.74 | — | — | 44.45 | — | — | 18.98 | 0.12 | 0.71 | 0.80 | 0.3 | 274.70 |
| Comp. Ex. 2 | 33.48 | 47.96 | — | — | — | — | 17.78 | 0.11 | 0.67 | 1.00 | 0.3 | 14.49 |
| Comp. Ex. 3 | 32.16 | — | — | 50.01 | — | — | 17.08 | 0.11 | 0.64 | 1.00 | 0.3 | 14.49 |
| Comp. Ex. 4 | 18.23 | — | — | — | 71.13 | — | 9.68 | 0.60 | 0.36 | 1.00 | 0.3 | 6.81 |
| Comp. Ex. 5 | 23.97 | — | — | — | — | 62.03 | 12.73 | 0.79 | 0.48 | 1.00 | 0.3 | 4.19 |

* In the table, "—" indicates that the component is not included.
Comp. Ex.: Comparative Example

TABLE 3

| Composition | Component (A) PEMP (% by mass) | Component (B) JER152 (% by mass) | JER1001 B80 (% by mass) | EP-4100 (% by mass) | B-5 (% by mass) | B-4 (% by mass) | Component (C) PERBUTYLO (% by mass) | Component (D) TEDA (% by mass) | Component (E) SIU2400 (% by mass) | Epoxy Groups/ Thiol Groups (Molar Ratio) | Component (C)/Thiol Groups (Molar Ratio) | Evaluation Adhesive Power (N/25 mm) |
|---|---|---|---|---|---|---|---|---|---|---|---|---|
| Comp. Ex. 6 | 54.32 | 15.56 | — | — | — | — | 28.85 | 0.18 | 1.09 | 0.20 | 0.3 | 1.58 |
| Comp. Ex. 7 | 47.58 | — | — | — | — | 24.63 | 25.27 | 1.57 | 0.95 | 0.20 | 0.3 | 4.80 |
| Example 17 | 39.08 | — | — | — | 38.10 | — | 20.75 | 1.29 | 0.78 | 0.25 | 0.3 | 309.98 |
| Example 18 | 36.30 | — | — | — | 42.49 | — | 19.28 | 1.20 | 0.73 | 0.30 | 0.3 | 350.05 |
| Example 19 | 45.95 | — | — | 28.58 | — | — | 24.40 | 0.15 | 0.92 | 0.40 | 0.3 | 251.98 |
| Example 20 | 38.18 | — | — | — | — | 39.53 | 20.27 | 1.26 | 0.76 | 0.40 | 0.3 | 301.79 |
| Example 21 | 44.36 | — | — | 31.04 | — | — | 23.56 | 0.15 | 0.89 | 0.45 | 0.3 | 214.94 |
| Example 22 | 44.04 | 31.54 | — | — | — | — | 23.39 | 0.15 | 0.88 | 0.50 | 0.3 | 196.36 |
| Example 23 | 32.16 | — | 50.01 | — | — | — | 17.08 | 0.11 | 0.64 | 0.50 | 0.3 | 320.26 |
| Example 24 | 42.88 | — | — | 33.34 | — | — | 22.78 | 0.14 | 0.86 | 0.50 | 0.3 | 209.05 |
| Example 25 | 34.74 | — | — | — | — | 44.97 | 18.45 | 1.15 | 0.69 | 0.50 | 0.3 | 198.24 |
| Example 26 | 41.43 | 35.60 | — | — | — | — | 22.00 | 0.14 | 0.83 | 0.60 | 0.3 | 276.30 |
| Example 27 | 29.24 | — | 54.55 | — | — | — | 15.53 | 0.10 | 0.58 | 0.60 | 0.3 | 391.98 |
| Example 28 | 40.21 | — | — | 37.51 | — | — | 21.35 | 0.13 | 0.80 | 0.60 | 0.3 | 175.32 |
| Example 29 | 26.80 | — | 58.34 | — | — | — | 14.23 | 0.09 | 0.54 | 0.70 | 0.3 | 432.47 |
| Example 30 | 37.84 | — | — | 41.18 | — | — | 20.10 | 0.12 | 0.76 | 0.70 | 0.3 | 154.76 |
| Comp. Ex. 8 | 33.48 | 47.96 | — | — | — | — | 17.78 | 0.11 | 0.67 | 1.00 | 0.3 | 2.88 |
| Comp. Ex. 9 | 32.16 | — | — | 50.01 | — | — | 17.08 | 0.11 | 0.64 | 1.00 | 0.3 | 1.12 |
| Comp. Ex. 10 | 18.23 | — | — | — | 71.13 | — | 9.68 | 0.60 | 0.36 | 1.00 | 0.3 | 0.02 |
| Comp. Ex. 11 | 23.97 | — | — | — | — | 62.03 | 12.73 | 0.79 | 0.48 | 1.00 | 0.3 | 0.12 |
| Comp. Ex. 12 | 30.55 | 52.51 | — | — | — | — | 16.23 | 0.10 | 0.61 | 1.20 | 0.3 | 1.12 |

* In the table, "—" indicates that the component is not included.
Comp. Ex.: Comparative Example

TABLE 4

| | Composition | | | | | | | | | Epoxy Groups/ Thiol Groups (Molar Ratio) | Component (C)/Thiol Groups (Molar Ratio) | Evaluation Adhesive Power (N/25 mm) |
|---|---|---|---|---|---|---|---|---|---|---|---|---|
| | Component (A) | Component (B) | | | | | Component (C) | Component (D) | Component (E) | | | |
| Composition | PEMP (% by mass) | JER152 (% by mass) | JER1001 B80 (% by mass) | EP-4100 (% by mass) | B-5 (% by mass) | B-4 (% by mass) | PERBUTYLO (% by mass) | TEDA (% by mass) | SIU2400 (% by mass) | | | |
| Comp. Ex. 13 | 15.96 | — | — | — | 74.71 | — | 8.48 | 0.53 | 0.32 | 1.20 | 0.3 | 0.11 |
| Comp. Ex. 14 | 21.32 | — | — | — | — | 66.23 | 11.32 | 0.70 | 0.43 | 1.20 | 0.3 | 0.10 |

\* In the table, "—" indicates that the component is not included.
Comp. Ex.: Comparative Example

[Evaluation]

As indicated in the tables above, the adhesive power in Examples 1 to 30 was high due to use of a composition which included the components (A) to (D), and in which the epoxy groups/thiol groups ratio of the total molar number of epoxy groups contained in the component (B) to the total molar number of thiol groups contained in the component (A) was more than 0.20 but less than 1.00.

In contrast, the adhesive power in Comparative Examples 1 to 14 was low as a result of the epoxy groups/thiol groups ratio being outside the range defined in the present invention.

The disclosure of Japanese patent Application No. 2013-265935, filed Dec. 24, 2013, is incorporated by reference herein in its entirety. All publications, patent applications, and technical standards mentioned in this specification are herein incorporated by reference to the same extent as if each individual publication, patent application, or technical standard was specifically and individually indicated to be incorporated by reference.

INDUSTRIAL APPLICABILITY

The adhesive sheet according to an embodiment of the present invention is suitable to, particularly, use for adhesion to rubber, and can suitably be used in a layered body including a rubber layer and an adhesion layer. However, the applications of the adhesive sheet are not limited thereto, and the composition can also be used, for example, in coating applications for imparting decoration or the like when colored particles or the like are incorporated into the composition.

The invention claimed is:

1. A layered body comprising a rubber layer, an adhesion layer and another layer in this order,
   the adhesion layer being formed using an adhesive composition layer,
   the adhesive composition layer being formed using a composition comprising:
   a polythiol compound;
   a compound having plural epoxy groups;
   a radical generator; and
   an amine-based catalyst,
   wherein a ratio (Ep/SH (epoxy groups/thiol groups ratio)) of a total molar number (Ep) of epoxy groups contained in the compound having plural epoxy groups to a total molar number (SH) of thiol groups contained in the polythiol compound is higher than 0.20 but lower than 1.00, and
   wherein a part of the amount of the polythiol compound is polymerized with the compound having plural epoxy groups through an anion polymerization, and another part of the amount of the polythiol compound is bound to rubber in the rubber layer via a thiol-ene reaction so as to chemically bind the adhesion layer to the rubber layer.

2. The layered body according to claim 1, wherein the radical generator is a thermal radical generator comprising a peroxide.

3. The layered body according to claim 1, wherein the polythiol compound is a primary thiol.

4. The layered body according to claim 1, wherein the compound having plural epoxy groups includes two or more aromatic rings or three or more aliphatic rings.

5. The layered body according to claim 1, wherein the polythiol compound has three or more thiol groups in a molecule thereof.

6. The layered body according to claim 1, wherein a molecular weight of the polythiol compound is from 200 to 3000.

7. The layered body according to claim 1, wherein the polythiol compound is selected from the group consisting of: a polythiol in which a portion other than thiol groups is an aliphatic hydrocarbon; a polythiol that is obtained by replacing halogen atoms of a halohydrin adduct of an alcohol by thiol groups; a polythiol that is a hydrogen sulfide reaction product of a polyepoxide compound; a thioglycolic acid ester that is obtained by an ester-forming reaction between a polyhydric alcohol having from 2 to 6 hydroxyl groups in a molecule thereof and thioglycolic acid; a mercapto fatty acid ester that is obtained by an ester-forming reaction between a polyhydric alcohol having from 2 to 6 hydroxyl groups in a molecule thereof and a mercapto fatty acid; a thiol isocyanurate compound that is obtained by a reaction between an isocyanurate compound and a thiol; a thiol that includes a polysulfide group; a silicone modified with thiol groups; and a silsesquioxane modified with thiol groups.

8. The layered body according to claim 1, wherein the compound having plural epoxy groups has an epoxy equivalent weight of 3000 or less.

9. The layered body according to claim 1, wherein the compound having plural epoxy groups is selected from the group consisting of an aromatic epoxide having a ring structure other than a glycidyl group, an alicyclic epoxide having a ring structure other than a glycidyl group, and modified products thereof.

10. The layered body according to claim 1, wherein the amine-based catalyst is a diamine.

11. The layered body according to claim 1, wherein a ratio of a total molar number of the radical generator to a total molar number of thiol groups contained in the polythiol compound (radical generator/thiol groups) in the composition is from 0.025 to 0.5.

12. The layered body according to claim 1, wherein the ratio (Ep/SH (epoxy groups/thiol groups ratio)) of the total molar number (Ep) of epoxy groups contained in the compound having plural epoxy groups to the total molar number (SH) of thiol groups contained in the polythiol compound in the composition is from 0.3 to 0.7.

13. The layered body according to claim 1, wherein the composition further includes a surface conditioner.

14. The layered body according to claim 1, wherein the amine-based catalyst is selected from the group consisting of bis(2-dimethylaminoethyl) ether, N,N,N', N'-tetramethyl hexamethylenediamine, tri ethylene di amine (TEDA), benzyl dimethyl amine, 2,2'-dimorpholinoethyl ether, and N-methylmorpholine.

15. The layered body according to claim 1, wherein the ratio (Ep/SH (epoxy groups/thiol groups ratio)) of a total molar number (Ep) of epoxy groups contained in the compound having plural epoxy groups to a total molar number (SH) of thiol groups contained in the polythiol compound is higher than 0.20 but equal to or lower than 0.80.

* * * * *